Aug. 27, 1968   H. B. EGLESTON   3,398,659
APPARATUS FOR FOLDING AND TUCKING A CONTAINER CLOSURE
Filed April 28, 1967   7 Sheets-Sheet 1

FIG. 1

INVENTOR
HARRY B. EGLESTON
BY
James H. Bower
ATTORNEY

Aug. 27, 1968     H. B. EGLESTON     3,398,659
APPARATUS FOR FOLDING AND TUCKING A CONTAINER CLOSURE
Filed April 28, 1967     7 Sheets-Sheet 3

INVENTOR
HARRY B. EGLESTON
BY
James H. Bower
ATTORNEY

Aug. 27, 1968 H. B. EGLESTON 3,398,659
APPARATUS FOR FOLDING AND TUCKING A CONTAINER CLOSURE
Filed April 28, 1967 7 Sheets-Sheet 4

INVENTOR
HARRY B. EGLESTON
BY
James H. Bowen
ATTORNEY

Aug. 27, 1968  H. B. EGLESTON  3,398,659
APPARATUS FOR FOLDING AND TUCKING A CONTAINER CLOSURE
Filed April 28, 1967  7 Sheets-Sheet 5

INVENTOR
HARRY B. EGLESTON
BY
James H. Bower
ATTORNEY

Aug. 27, 1968  H. B. EGLESTON  3,398,659
APPARATUS FOR FOLDING AND TUCKING A CONTAINER CLOSURE
Filed April 28, 1967  7 Sheets-Sheet 6

INVENTOR
HARRY B. EGLESTON
BY
James H. Bowen
ATTORNEYS

Aug. 27, 1968    H. B. EGLESTON    3,398,659
APPARATUS FOR FOLDING AND TUCKING A CONTAINER CLOSURE
Filed April 28, 1967    7 Sheets-Sheet 7

INVENTOR
HARRY B. EGLESTON
BY
James H. Bower
ATTORNEY

United States Patent Office 3,398,659
Patented Aug. 27, 1968

3,398,659
APPARATUS FOR FOLDING AND TUCKING
A CONTAINER CLOSURE
Harry B. Egleston, Livonia, Mich., assignor to
Ex-Cell-O Corporation, Detroit, Mich.
Filed Apr. 28, 1967, Ser. No. 634,633
21 Claims. (Cl. 93—44.1)

ABSTRACT OF THE DISCLOSURE

A folding and tucking apparatus for a container end closure fabricating machine where a pair of oppositely rotating blades have pitch-angles that cooperate with an inclined fixed camming shoe such that when the blades are rotated to operate on the closure the blades are inclined toward the camming shoe. An overload clutch is connected with the drive means to automatically disengage the rotary blades and the fabricating machine during a jam-up of the folding and tucking apparatus.

---

This invention in general relates to paperboard container forming machines and more particularly to the paperboard container end closing means on these machines. As hereinafter described this invention is more specifically directed to an apparatus and method for closing a container end so as to be permanently bonded at almost the same instant.

Thermoplastic paperboard containers are being used in increasing quantities in preference to other commonly used means. The success of these new containers has caused a great demand for new forming and filling equipment of the continuous motion type. By this it is meant that the containers being formed by the machine are moved through the latter in a continuous procession at a substantially constant rate, the forming operations being carried on while the container blanks and bodies are in motion rather than while they are momentarily halted. One machine of this general type is disclosed in U.S. Patent 2,770,175, issued Nov. 13, 1956, in the name of James F. Earp. However, machines of this type were designed for containers that required coating with paraffin or wax after being formed and have no application to the present plastic coated containers employing fold-in bottom closures.

One illustration of a container adapted to be formed by the apparatus disclosed and claimed herein is disclosed in Patent No. 3,120,335, issued Feb. 4, 1964, upon the application of Harry B. Egleston and Charles Z. Monroe, and assigned to the assignee of the subject application. More detailed information on such a container may, of course, be had upon direct reference to such application. For present purposes, however, it will suffice to note that the container or carton disclosed therein is made of high grade paperboard stock coated on both sides with thermoplastic material such as a polyethylene. The polyethylene coating on the paperboard is utilized not only as a moisture proofing material but also serves as a heat and pressure sensitive adhesive which cooperates in sealing the closure panels of the container so as to make a fluid tight package. A container blank can be formed from the coated paperboard stock in the usual manner of stamping and scoring blanks, folding them over and, by means of a suitable side seam, providing a flattened tube which may be erected into a container in an automatic machine.

A disadvantage of the present paperboard container end closing means, such as the one disclosed in U.S. Patent No. 3,187,647, issued June 8, 1965, upon the application of Eric A. Braun, is that they operate best with a spider wheel type mandrel assembly which is driven with an intermittent angular motion.

It is an object of this invention to provide a novel container closing apparatus which operates with a continuous motion type forming machine.

Still another objective is to provide a means to fold and tuck the panels of the end closure of a thermoplastic coated paperboard container so as to eliminate a separate prebreaking operation upon the closure panels.

A further object of the instant invention is to provide an end folding and tucking apparatus having first and second rotating blade means having pitch-angles disposed to cooperate with camming means to fold a container tuck-in closure panel into underlaying relation with a complementary tuck-over panel.

A still further object of the present invention is to provide an end folding and tucking apparatus having first and second blade means rotatable in opposed relation having different pitch-angles and camming means disposed relative to said first and second blade means having a camming surface positioned at an angle that is greater than either pitch-angle of said first and second means.

It is still another object of the present invention to provide a novel continuous motion container bottom closing apparatus which is adapted to operate on a tubular container blank while it is in an upright position and moving in a circular path.

It is another object of the present invention to provide a novel and improved bottom folding and tucking apparatus having first and second rotating blade means for operation on a container closure tuck-in flap panel wherein the tuck-in flap is moved obliquely relative to the tuck-over flap during the tucking sequence.

A further object of the present invention is to provide a novel continuous motion containing bottom closing apparatus which is adapted to operate on a tubular container blank after the bottom closure portion is selectively heated to the activation temperatures of the thermoplastic coating so that the matching inner and outer surfaces will be bonded when pressed together and cooled.

It is still another object of the present invention to provide a novel and improved container bottom forming apparatus for a container packaging machine which includes a novel mechanism for automatically stopping the machine if there is a jam-up in the bottom forming apparatus insuring that the machine will not be damaged.

Other objects, features and advantages of this invention will be apparent from the following detailed description, appended claims, and the accompanying drawings.

Figure 1:
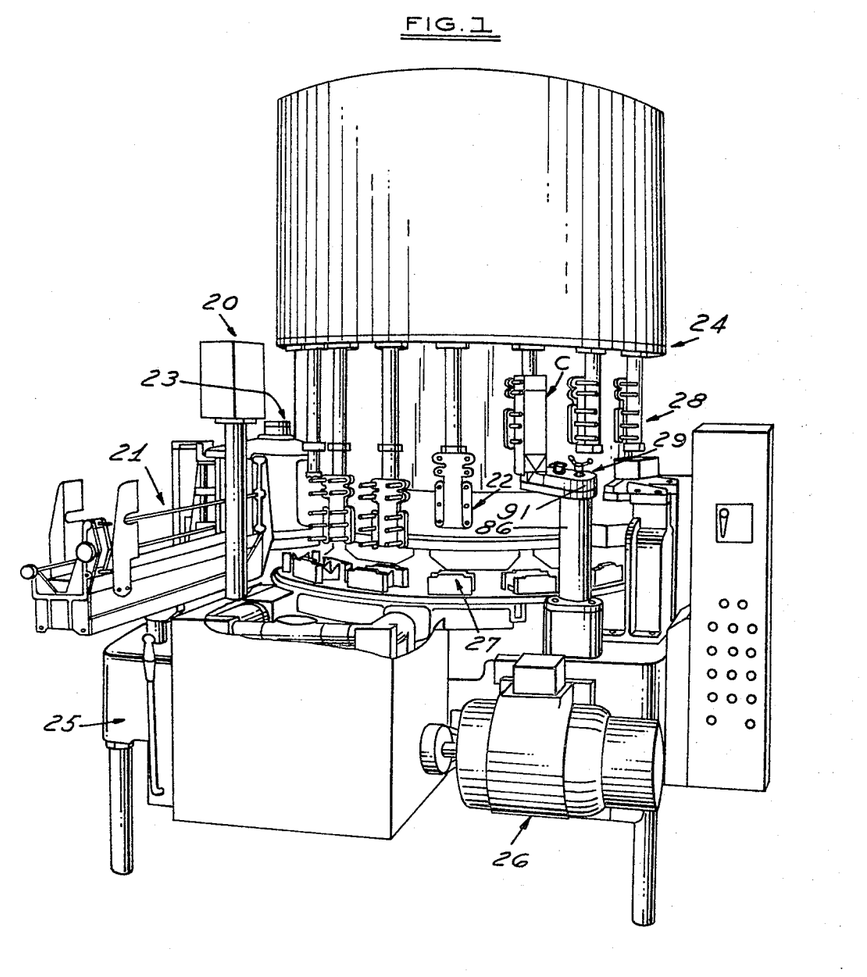
FIG. 1 is a perspective view of an illustrative carton fabrication machine embodying the present invention.

The forming machine generally indicated at 20 in FIG. 1 may be used with any suitable container filling and sealing machine such as the one disclosed in the copending application of Harry B. Egleston, Ser. No. 448,545, filed Apr. 15, 1965, now Patent No. 3,370,399, issued Feb. 27, 1968, which application is assigned to the same assignee as the instant application and the disclosure thereof is incorporated by reference herein. The machine 20 is adapted to receive a supply of flat collapsed side seamed blanks from the magazine 21, shown in an empty condition at the left hand side of FIGURE 1. One blank at a time is removed from the magazine 21 and retained in a vertically reciprocating container carrier 22 by suitable means, such as flexible suction cups (not shown). A rotary feeder indicated generally at 23, of the general type disclosed in U.S. Patent 2,936,681, issued May 17, 1960, in the name of James F. Earp, is used to transfer the blanks from the magazine 21 to the container carriers 22.

The container carriers 22 rotate with rotary turret assembly 24 in a counterclockwise direction on the machine base 25 about a vertical shaft. Power to rotate the turret 24 is transmitted to the vertical shaft by suitable gears, cams, etc., from a motive source 26. Initially each container bottom closure is lowered over an individual heater unit 27, rotating in unison with the turret 24, and retained in its lowered position a suitable interval during which time the container bottom closure is selectively heated to a controlled temperature to activate its thermoplastic coating to allow bonding, as disclosed in detail in the aforementioned U.S. Patent 3,120,335. After the closure is properly heated the carrier 22 transfers the tubular container, indicated at C in FIGURE 1, vertically where it is loaded on its associated vertical mandrel, indicated generally at 28. The mandrels 28 rotate in fixed relation with the container carriers 22 and heating units 27. As the container is being loaded on its individual mandrel by means of the upward movement of the carrier the continuously rotating turret 24 moves the container C to the position shown in FIGURE 1, where it has completed its upward travel and is approaching the bottom forming assembly 29 of the present invention.

While the bottom forming assembly of this application may be used with various types of container forming machines it is disclosed in its embodiment with the forming machine in my copending U.S. application Ser. No. 640,444, filed May 16, 1967. For a detailed description of the operation of the rotating turret assembly shown in FIGURE 1 reference should be made to the last mentioned copending application, the disclosure thereof being incorporated by reference herein.

Figure 2:
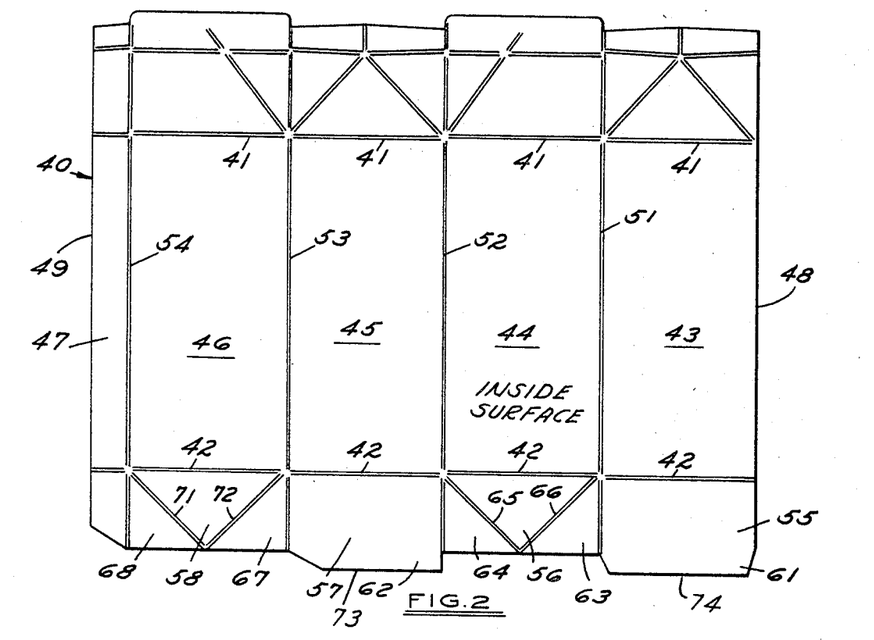
FIG. 2 is a layout view of a blank from which the cartons are erected and showing the inside surface thereof.

Referring to FIGURE 2 the container 40 is in flat blank form pressed with a pattern of appropriate score lines and having its inside surface showing. The container is separated into three sections by score lines 41 and 42. The material above score line 41 is the top closure, a discussion of which is not necessary for disclosure of the present invention; however, a complete disclosure is given in U.S. Patent 3,270,940, issued Sept. 6, 1966, on an application of Harry B. Egleston and Charles Z. Monroe. The material between the score lines 41 and 42 is the body group and comprises four panels, 43 through 46, and side seam flap 47. The body groups is defined on the sides by edges 48 and 49, and with the panels being separated by score lines 51 through 54. The material below score line 42 is the bottom closure group and comprises major bottom closure panels 55 and 57, fold-in-panels 56 and 58, fold-under panels 63, 64, 67, 68, and flaps 61 and 62, and side seam flap 47. The bottom closure group panels defined on the sides by the edges 48 and 49 are separated by score lines 51 through 54. The major bottom closure panel 55 has the extended tuck-in flap 61 and major bottom closure panel 57 has the extended tuck-over flap 62. The bottom fold-in panel 56 is flanked by the triangular fold-under panels 63 and 64 that are connected thereto by score lines 66 and 65, respectively. Similarly, the bottom fold-in panel 58 is flanked by the triangular fold-under panels 67 and 68 that are connected thereto by score lines 72 and 71 respectively.

Figure 3:
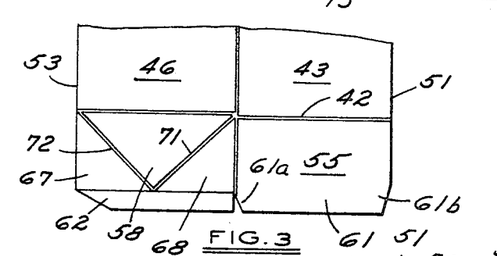
FIG. 3 is the bottom closure portion of a flat side seamed blank made from the blank shown in FIG. 2 and showing the outside surface thereof.

To form a flat side seam blank, as is presented to the forming machine 20, the panel 46 and side seam flap 47 are folded about score line 53 until their inside surfaces contact the inside surfaces of panels 45 and 44, respectively. The panel 43 is folded about score line 51 until it contacts the inside surface of panel 44 and the outside surface of side seam flap 47. The surface along edge 48, which will meet the outside edge of the side seam flap, will be heated together with the outside surface of side seam flap 47 to activate their thermoplastic coating so that the two surfaces will be bonded when pressed together and cooled. The edge 48 and the score line 54 now appear as one line. The bottom closure portion of flat container blank, as shown in FIGURE 2, now looks like the fragmentary flat side seam container blank as shown in FIGURE 3. It is now ready to be supplied to the forming and filling machine.

Figure 4:
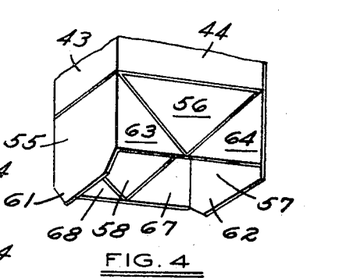
FIG. 4 is a perspective view of the carton end closure in tubular form as it appears when first mounted on the mandrel assembly.
Figures 4A, 5:
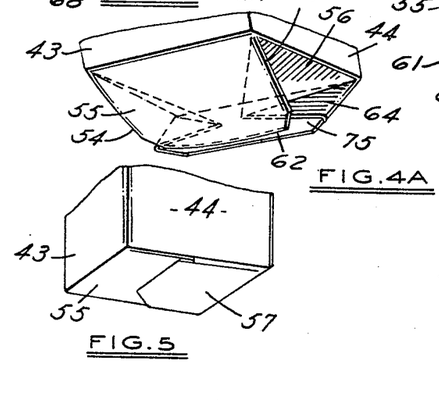
FIGURE 4A is a perspective view of the carton end closure in an initial stage of its folding and tucking operation.
FIG. 5 is a perspective view of the carton end closure after it has been formed and heat sealed.

When the container 40 is loaded on the mandrel 28, it takes a tubular shape, as seen in FIGURE 4. To form the bottom initially the triangular panels 56 and 58 are moved inward toward each other, after which the major panels 55 and 57 are also moved inward toward each other. This causes fold-under panels 68 to rotate around score line 71 so that the inside surface of panels 68 and 55 are coming together. At the same time panel 68 is rotating about score line 71 the outside surfaces of panels 68 and 58 are approaching each other. Fold-under panels 63, 64 and 67 make the same movements as panel 68 with the panels 55–56, 56–57, and 57–58, respectively. Bottom closure panel 55 moves toward bottom closure panel 57 just enough faster than panel 57 moves toward panel 55 so that tuck-in flap 61 is positioned between fold-under panels 64 and 67, and panels 57 and tuck-over flap 62. After the bottom closure is completely formed it appears as shown in FIGURE 5.

Turning now to the bottom closing assembly 29 (FIGURES 6 and 7), it will be noted that the same comprises a pair of relatively short, upstanding spindles 82, 84. These spindles are arranged in laterally spaced and radially aligned positions, indicated in FIGURE 6 by section line 7—7, relative to the rotational axis of the turret 24. The assembly 29 is supported by an upstanding column 86 shown in FIGURE 1 integral with or otherwise rigidly fixed to the base 25. An upright drive shaft 87 (FIGURE 7) is journaled by bearings 88 within the upstanding column 86 and is connected by sprocket drive 89 to a suitable chain drive arrangement to the drive motor 26. The upright drive shaft 87, in turn, has a driving gear 90 fixably keyed at its upper end and which is supported within the housing generally indicated at 91. The gear drive 90 drives the smaller diameter gears 92, 94, keyed to spindles 82, 84, respectively; through intermediate freely running gears 96, 98 and 100 arranged on upwardly extending shafts 102, 104, and 106, respectively in the housing 91. The intermediate gears are of the same diameter and mesh with the spindle gears 92, 94 so that, when the intermediate gears are driven, spindles 82 and 84 will be revolved in unison but in opposite directions at equal speeds.

Figure 6:
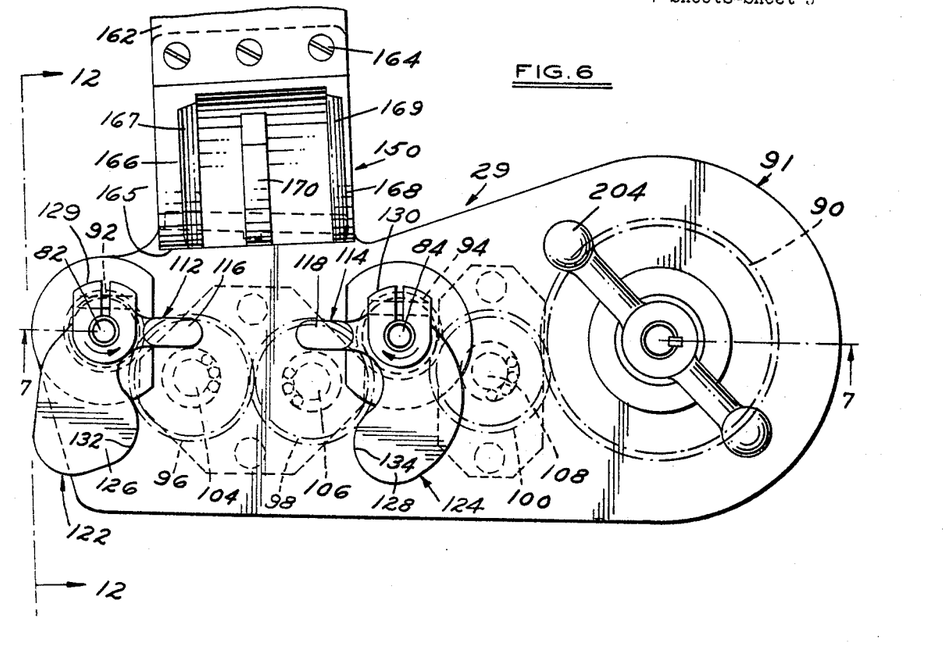
FIG. 6 is a plan view of the carton tucker assembly of the instant invention.

As indicated in FIGURE 6, the outboard or radially outer spindle 84 rotates in a clockwise direction while the inboard or radially inner spindle 82 rotates in a counterclockwise direction. The spindles 82, 84 carry at an intermediate point above the upper surface 110 of housing 91 fingers 112, 114 adjustably secured by suitable means such as the split-end grip type connections shown in the instant disclosure. The spindles 82, 84 in addition carry adjacent their upper ends blade members indicated generally at 122 and 124 adjustably secured both axially and angularly by suitable means which in the present form consists of retaining collars 129, 130 having split-end type connections.

As best seen in FIGURES 14–17, showing detail views of the blades, the upper surfaces 126, 128 respectively of each blade is substantially planar in overall configuration and the blades are integrally formed with their respective retaining collars 129, 130. It will be noted in FIGURES 16 and 17 that the leading edges 132, 134 of the blades 122, 124 are located at different elevations with respect to the horizontal plane tangent to the uppermost blade edge represented by the trace line 133. As there shown, the upper face 126 of the blade 122 intersects its collar 129 in a manner that the included angle A is formed by the face 126 and the plane represented by line 133, at their intersection. In a similar fashion the angle formed by the face 128 and the plane of line 133 is an included angle B. In the instant embodiment it is preferred to have the relationship be such that the included angle A will be substantially 6°30′ and the angle B 9°30′. This relationship between the pitch angles A and B is such as to provide for a difference of approximately 3° and has been found to be the most desirable upper surface relationship between the working faces 126, 128, of the blades for the disclosed embodiment.

Figure 14:
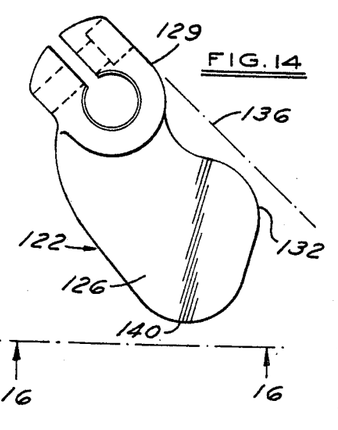
FIGS. 14 and 15 are plan top views of the blades disassembled to illustrate their structural features.
Figure 15:
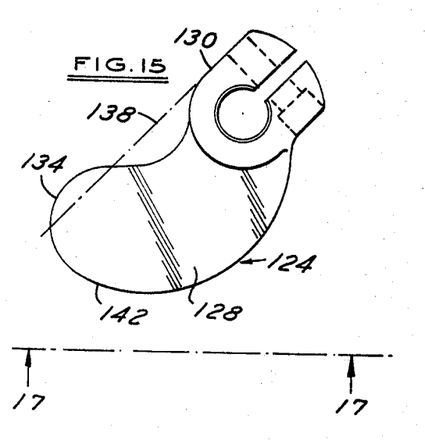

As best seen in FIGURES 14 and 15 the leading edge portion 132, of the blade 122 does not reach the trace line 136 while the leading edge portion 134 of the blade 124 extends beyond the trace line 138. This difference in blade design is evident in FIGURES 16 and 17, which shows the leading edge portion 132 extending a distance X beyond its collar 129 while the edge portion 134 extends a distance Y beyond its collar 130. In the embodiment shown the distance X is approximately .95 inch and the distance Y is approximately 1.30 inch. Also the trailing edge portion of blade 122 has an enlarged lobe portion 140 in contradistinction to the trailing edge portion 142 of blade 124. The reasons for the differences in configuration between blades 122, 124 will be explained during the container closing operation discussion to follow.

Figure 12:
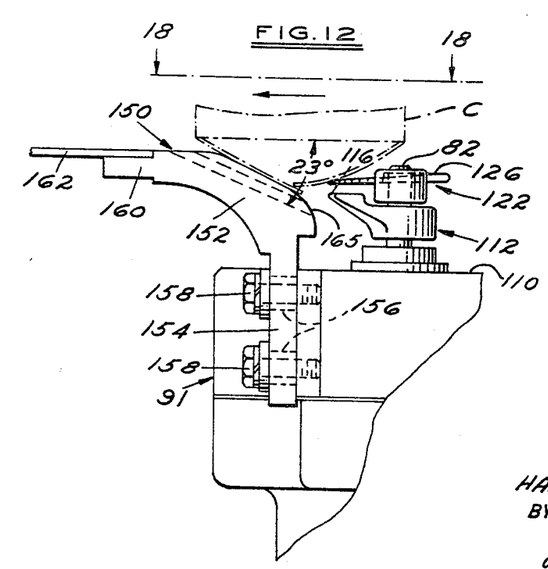
FIG. 12 is a fragmentary side elevation view taken along the line 12—12 in FIG. 6 and showing the blades rotated in opposite directions relative to each other into contact with a container closure being tucked.

The camming shoe 150, shown in FIGURES 6 and 12, has a central body 152 with a vertically disposed plate 154 for adjustable positioning on the housing 91 by means of elliptical bolt holes 156 and bolts 158. The horizontally oriented portion 160 is recessed to receive the flexible cantilevered plate 162, which is preferably formed on a resinous sheet material such as "Teflon" to minimize friction contact on the container closure. Suitable means, such as the countersunk screws 164, are used to secure the plate 162 to the shoe 150.

The body portion of the shoe 150 is provided with a pair of camming tracks 166, 168 having their inner opposed edges chamfered at 167, 169 respectively; and formed with a central recessed camming track 170 for a reason to be explained presently. It will be noted in FIGURE 12 that the camming tracks 166, 168 and 170 are inclined toward the blades at an angle of approximately 23° to the horizontal. However, this slope angle of 23° for the tracks may vary as required so long as the relationship between the blade pitch-angles and the shoe slope angle satisfy the general condition that it is substantially greater than the pitch-angle of either blade.

Figure 9:
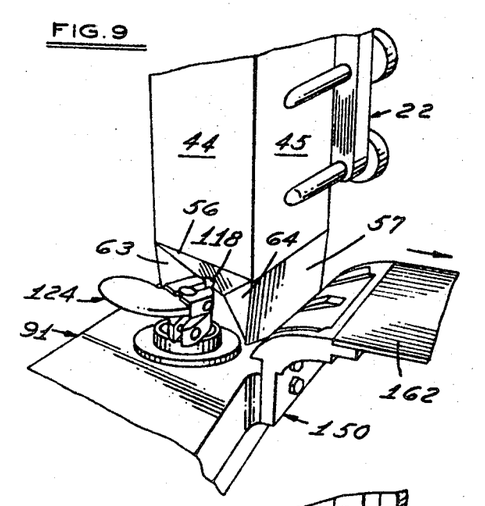
FIGS. 9–11 are perspective views detailing sequentially certain of the steps in the folding and tucking of the bottom closure of a carton.
Figure 10:
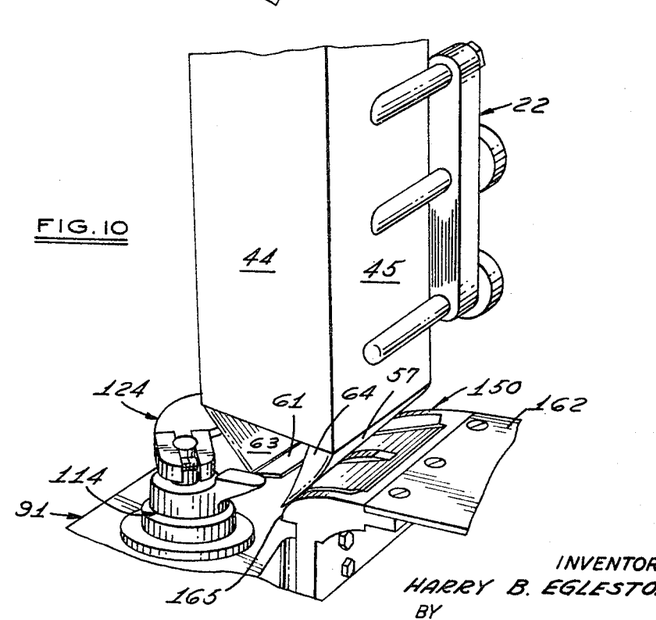
Figures 11, 13:
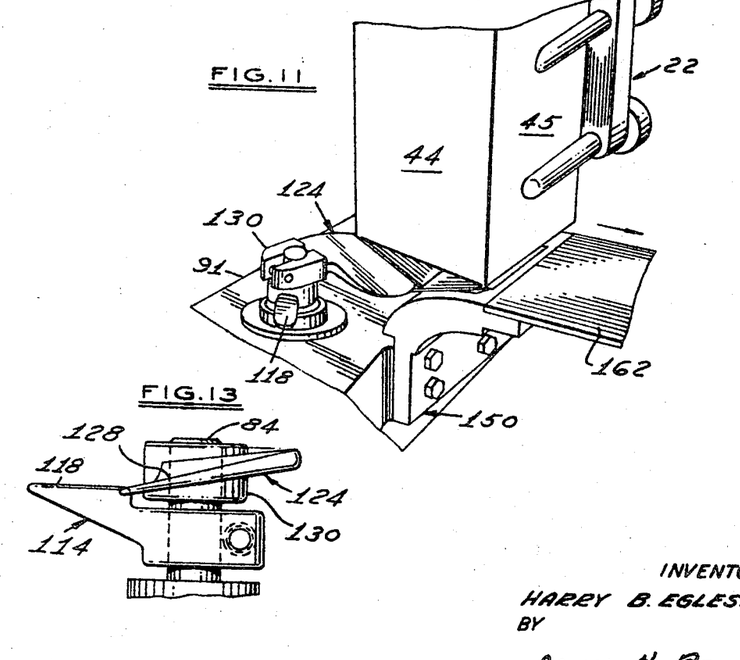
FIG. 13 shows the right hand blade and finger assembly of FIG. 7 enlarged detailing the relationship of the blade and finger.

Looking now at FIGURES 9–11, the folding and tucking action is clearly seen as the container, having been fully mounted on a mandrel, is transported in continuous motion above housing surface 110 to be operated upon by the folding and tucking assembly 29. The turret 24, from which the mandrels 28 depend, is rotated in timed relation with the spindles 82, 84 such that the breaker fingers or wings 112, 114 are in straddling relation to the closure as they rotate into substantially simultaneous contact with the triangular fold-in panels 56, 58 and begin to fold them inwardly. The upper surfaces 116, 118 of the breaker fingers are positioned at substantially the same working level so that the opposed rounded tips of the fingers contact the panels 56, 58 just ahead of their vertical axis of symmetry extending from the intersection of the pairs of score lines 65, 66 and 71, 72 such that said scores are broken approximately in unison. As the container continues to travel the fingers are rotated to their opposed position shown in FIGURE 6 at such a speed as to maintain contact with the panels 56, 58 to continue their inward movement. In the position shown in FIG. 6 the centerline of the fingers is on the centerline of a rotating mandrel so that both coincide with section line 7—7. This insures that the fold-in panels 56, 58 will move inward with minimal contact at the same time, and that there will be no opportunity for them to move outward, resulting in a scrap container and possible jamming of the machine.

As the mandrel continues to travel the breaker fingers are rotated to a position where contact is about to be lost between the fingers and fold-in panels at which time the lower radial camming edge portion 165 of shoe 150 initially contacts the panel 57. As indicated earlier the tucker shoe 150 has the outer camming tracks chamfered inwardly at 167, 169, and the track 170 recessed to allow the shoe to bow the panel 57 outwardly and thereby develop a bottom envelope or pocket, shown at 75 in FIGURE 4A. While it will be observed that the camming shoe 150 is oriented so that the edge 165 is radially positioned to compensate for the circular path of travel of the mandrels; the instant folding and tucking concept can be used with other mandrel arrangements, such as the familiar "spider wheel" type of the aforementioned U.S. Patent 3,187,647 for example, without departing from the scope of the invention.

Immediately after contact by edge 165 the follower blades 122, 124 make initial contact with the outer folding ribs formed by panel 55 and its associated gusset panels 63, 68, along their folded scores 54, 51 (FIGURE 10). Further rotation of the blades brings their leading feathered edges 132, 134 into contact with the panel 55. The convex feathered edges 132, 134 are designed to apply sufficient force to continue the uninterrupted formation of the closure while permitting only a minimal contact with panel 55 so as to prevent damage to the plastic coating thereon. As the blades advance into the region between the spindles the fact that the slope of the blade surfaces 126, 128 are both less than the slope angle of shoe 150 and opposed thereto allows them to work in unison on panel 55 so that the panel 55 is folded in a controlled and supported manner.

Figures 16, 17:
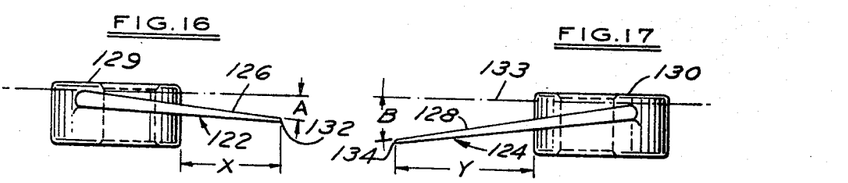
FIGS. 16 and 17 are elevational end views taken along the lines 16—16 and 17—17 in FIGS. 14 and 15 respectively.
Figure 18:
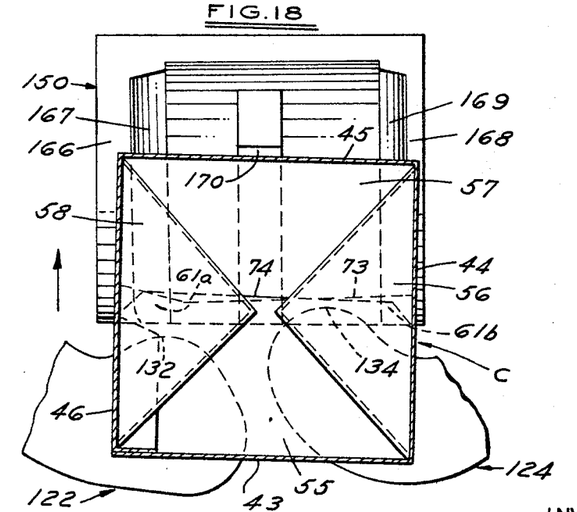
FIG. 18 is a broken sectional view of a diagrammatic nature taken along the line 18—18 of FIG. 12.

At this point in the bottom closure formation the differences in follower blade geometry discussed above will take effect. As seen in FIGURES 16–18, the difference in pitch angles A and B results in blade edge 132 making contact with the inboard portion of the panel 55 at a different working level than blade edge 134, which makes contact with the outboard portion of panel 55. In the instant embodiment the blade 122, by virtue of angle A being less than angle B, makes contact with the inboard portion of the panel 55 at a working level nearer to the bottom face of the mandrel cap than blade 124 and thereby starts the tucking of flap panel portion 61a into the envelope 75 ahead of the portion 61b. This tucking action can be seen in FIGURE 18 from the oblique angle relationship of free edge 74 of tuck-under flap 61 relative to free edge 73 of tuck-over flap 62 which results in a scissors-like relative movement between the edges 73 and 74. It will be noted that the fact that the working level of blade 124 is positioned below blade 122 requires that its edge 134 lead edge 132 to allow them to operate in unison on the closure panel 55. The feathered convex shape of the working edges of the blades allows them to guide and support the tuck-in flap until it is well into the envelope 75 to insure proper completion of the tucking operation. Due to the accelerated tucking of the flap area 61a ahead of 61b results in blade 122 breaking contact with the closure before the blade 124. The differences in blade configuration at trailing edges 140 and 142, together with the differences in their lengths, indicated by dimensions X and Y is necessitated by the arcuate path of travel of the mandrels and would not be required in other embodiments such as the aforementioned "spider wheel" type machines, for example.

An advantage gained from the foregoing tucking sequence is to produce or maintain an enlargemnet of the envelope 75 adjacent gusset panel 67, where the initial tucking occurs, because of the higher working level of blade 122. The resulting unbalance of force on panel 55 causes increased reactive force of the panel 55 on blade 122 which acts to hold gusset panel 67 away from panel 57 long enough to insure reliable insertion of flap area 61a. Another advantage of the invention, pertinent to the disclosed embodiments, is that the concept of positively leading or accelerating the inboard portion 61a of the flap into the envelope 75 ahead of the outboard portion 61b obviates the need for extremely accurate machine design and manufacture to compensate for the arcuate path of the mandrels 28.

As the mandrel continues to rotate, the blade 124 breaks contact with the container and the bottom is pushed closed along the substantially horizontal camming surface provided by the plate 162. In this case applicant's use of a solid Teflon plate member 162 provides a smooth camming surface which prevents damage to the heat activated plastic coating. Also, the flexible action of the plate 162 resulting from its cantilevered support on shoe 150 insures that bonding will not occur until pressure is applied to the closure elements during the sealing operation described in my copending application 640,444, filed May 16, 1967.

Figures 7, 7A:
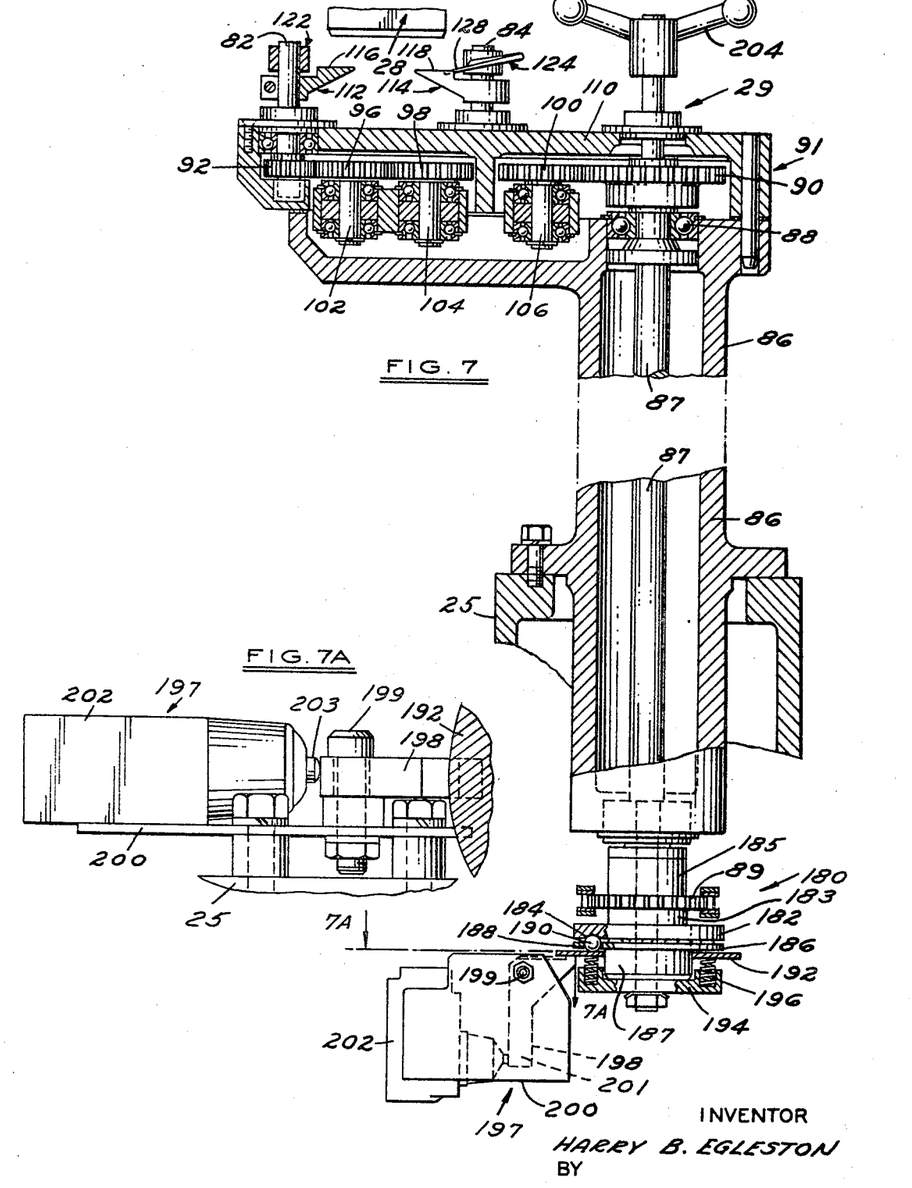
FIG. 7 is a vertical sectional view through the tucker housing and portions of its support column substantially in the plane of line 7—7 of FIG. 6.
FIG. 7A is an enlarged, fragmentary, vertical sectional view taken along the line 7A—7A of FIG. 7.
Figure 8:
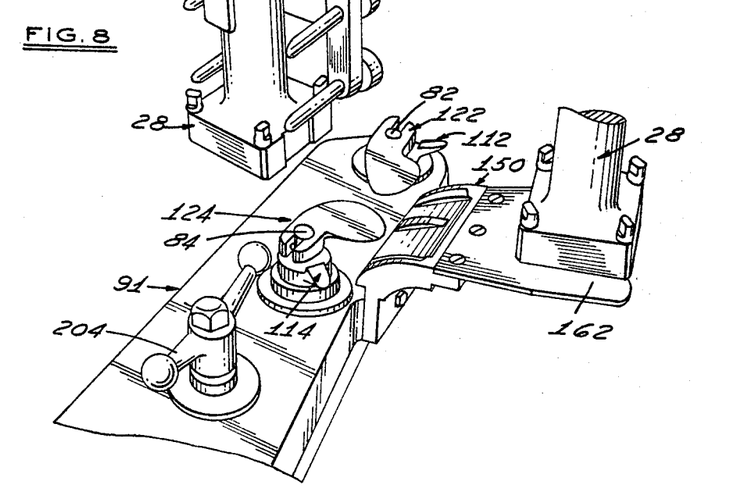
FIG. 8 is a perspective view of the carton bottom folding and tucking apparatus of the instant invention with no cartons on the mandrels.

Referring now to FIGURE 7 it will be seen that coupled to the bottom end of shaft 87 is an overload clutch assembly indicated generally at 180. The clutch consists of a thrust plate 182, having a plurality of detents 184 and an upwardly extending sleeve portion 183 positioned around the shaft 87, such that sleeve 183 is fixably secured to the sleeve 185 of sprocket 89 by axial bolts (not shown). Immediately adjacent the thrust-plate 182 is a ball retaining ring 186 having its cylindrical hub-portion 187 keyed ot the shaft 87 to prevent relative rotation therebetween. The ball retainer ring 186 is provided with apertures 188 for the reception of balls 190, the balls thereby rigidly maintained in their respective detents.

A pressure plate 192 is mounted for axial movement along the outer cylindrical surface of hub 187. It will be noted that the pressure plate 192 is followed by spring retainer 194 which supports compression springs 196 between the plate 192 and retainer 194, thus constraining pressure plate 192 in the direction of thrust plate 182. Rotative force is thus transferred from sprocket drive 89 and thrust plate 182 to the shaft 87 through the interaction of thrust plate 182, and retainer plate 186 with balls 190. Assuming an overload on shaft 87, due to container jamming which prevents the tucker fingers or blades from rotating properly, pressure plate 192 will be forced axially away from retainer plate 186 by balls 190 which are rolled from their detents 184, when this occurs the downward movement of pressure plate 192 will not only disengage shaft 87 but will cause stoppage of the machine by means of the detector device indicated generally at 197.

The detector 197 includes a bell crank 198 mounted on a pivot pin 199 (FIGURE 7A) carried in a bracket 200 and secured to the main frame adjacent the clutch assembly 180. The bell crank extends horizontally into the path of travel of the pressure plate 192. The bell crank is also formed with a long tail portion 201 extending down into contact with the microswitch 202 which is suitably affixed to the side of bracket 200. The switch is provided with a movably spring held plunger 203 engaging the tail 201. Hence, when pressure plate 192 is forced downwardly it rocks the bell crank to force the plunger inward sufficiently to open the microswitch 202 breaking the motor operating circuit. The entire machine is thus stopped until the jammed container can be removed.

In order to reset the fingers and blades for proper operation, handle means 204 is provided to allow the operator to rotate the shaft 87 to re-engage the detents and balls. In the particular arrangement disclosed three detents 184 are arranged in circumferentially spaced relation on the plate 182 to receive three steel balls 190 providing a three contact support on the pressure plate. As the spindles 82, 84 are geared to make three revolutions for each revolution of the shaft 87, it is only necessary to revolve the retainer plate 186 through approximately one-third of a revolution to engage the balls in the next succeeding detent and thereby accomplish the resetting of the folding and tucking apparatus 29 for resumption of the machine operation.

It will be apparent from the foregoing description that the bottom folding apparatus 29 of the present invention includes rotating breaking fingers which cooperate with rotating follower blades having pitch-angles uniquely arranged with a camming shoe to engage the panels of the bottom closure to rapidly and accurately fold-in and tuck the panels in a reliable manner so that they are ready to be heat pressure sealed. Superior closures are attained since minimal damage of the plasticized coating results from contact by the apparatus, thereby assuring that a firm seal will be obtained when pressure is applied to the closure panels.

While the invention is susceptible of various modifications and alternative constructions, a certain illustrative embodiment has been shown in the drawings and discussed above in considerable detail. It should be understood, however, that this is no intention to limit the invention to the specific form disclosed but, on the contrary, the invention is to cover all modifications, alternative constructions, and equivalents fully within the spirit of and scope of the invention as expressed in the appended claims.

What is claimed is:

1. In a container fabricating machine, a folding and tucking apparatus to operate on container end closure panels comprising:
   (a) breaker means operable on a first pair of opposed closure panels;
   (b) tucker shoe means having an inclined camming portion operable on one panel of a second pair of opposed closure panels adjacent said first pair of panels;
   (c) first and second oppositely rotating tucker blade means operable on the remaining panel of said second pair of panels; and
   (d) said first and second blade means having a pitch-angle wherein when they are rotated to operate on the remaining panel each said blade means is inclined toward said tucker shoe camming portion to form a tucked end closure.

2. In a container fabricating machine, the combination defined in claim 1, wherein:
   (a) said first and second blade means are disposed to operate on the closure at different working levels.

3. In a container fabricating machine, the combination defined in claim 2, wherein:
(a) the pitch-angle of said first blade means is less than the pitch-angle of said second blade means; and
(b) said first and second blade means related so that the leading edge portion of said second blade means is disposed ahead of the leading edge portion of said first blade means.

4. In a container fabricating machine, the combination defined in claim 3, wherein:
(a) one of said second pair of closure panels is provided with a tuck-in flap and the other of said second pair of closure panels is provided with a tuck-over flap;
(b) said tucker shoe means is initially operable on the tuck-over flap panel at a time subsequent to the initial contact of said breaker means on the first pair of panels; and
(c) said first and second blade means initially contacting the tuck-in flap panel susbtantially in unison to effect oblique relative movement between the tuck-in flap and tuck-over flap.

5. In a container fabricating machine, the combination defined in claim 1, wherein:
(a) said tucker shoe inclined portion is positioned at an angle substantially exceeding the pitch-angles of said first and second blade means.

6. In a container fabricating machine, the combination defined in claim 1, wherein:
(a) the working edges of said first and second blade means have a convex feathered working edge configuration to allow maximum panel contact during formation of the closure.

7. In a container closure fabricating machine, the combination defined in claim 1, wherein:
(a) one of said second pair of closure panels is provided with a tuck-in flap and the other of said second pair of closure panels is provided with a tuck-over flap;
(b) said tucker shoe means is formed to assist in developing an envelope portion in conjunction with the tuck-over flap panel of the closure; and
(c) said first and second blade means operable asymmetrically on the tuck-in flap panel to cause oblique insertion of the tuck-in flap within the developed envelope.

8. In a container fabricating machine, the combination defined in claim 1, wherein:
(a) said breaker means comprises a breaker finger rotating in fixed relation with each of said blade means such that said fingers are positioned at substantially the same working level and in aligned facing arrangement prior to engagement of the closure by said blade means.

9. In a container fabricating machine, the combination defined in claim 8, wherein:
(a) said tucker shoe means engages the tuck-over flap panel just prior to the loss of contact between said breaker fingers and the first pair of opposed closure panels.

10. In a container fabricating machine, the combination defined in claim 1, wherein:
(a) said tucker shoe means having a flexible cantilevered support extending therefrom to complete the folding of the closure without applying sealing pressure thereto.

11. In a machine for fabricating container bottom closures from tubular blanks of paperboard or the like cut and scored to define in each blank a first pair of opposed fold-in closure panels and a second pair of opposed tuck-in flap and tuck-over flap panels, the combination comprising:
(a) a machine base;
(b) a rotary turret mounted on said base and having a plurality of bottom forming mandrels mounted in spaced apart depending relation thereon;
(c) a pair of upstanding spindles arranged in laterally spaced and radially aligned position in straddling relation with the path of said mandrels;
(d) means for rotating said spindles in opposite directions relative to each other and in timed relation with said rotary turret;
(e) each said spindle having a breaker means thereon operable on one of said first pair of opposed fold-in closure panels;
(f) tucker shoe means fixed on said base and having a camming portion inclined toward said spindles operable on the tuck-over flap panel;
(g) each said spindle having a blade means thereon operable on the tuck-in flap panel; and
(h) each said blade means having a pitch-angle wherein when they are rotated to operate on the tuck-in flap panel they are inclined toward said tucker shoe camming portion to form a tucked end closure.

12. In a container fabricating machine, the combination defined in claim 11, wherein:
(a) each said blade means disposed to operate on the tuck-in flap panel at different working levels.

13. In a container fabricating machine, the combination as defined in claim 12, wherein:
(a) the pitch-angle of the inboard one said blade means is nearer a horizontal reference plane than the pitch-angle of the outboard one of said blade means; and
(b) said inboard and outboard blade means related so that the leading edge portion of said outboard blade means is disposed ahead of the leading edge portion of said inboard blade means.

14. In a container fabricating machine, the combination as defined in claim 13, wherein:
(a) said tucker shoe means is initially operable on the tuck-over flap panel at a time subsequent to the initial contact of said breaker means on the first pair of panels; and
(b) each said blade means initially contacting the tuck-in flap panel substantially in unison to effect oblique relative movement between the tuck-in flap and the tuck-over flap.

15. In a container fabricating machine, the combination defined in claim 11, wherein:
(a) said tucker shoe inclined portion is positioned at an angle to the horizontal substantially exceeding the pitch-angles of each of said blade means.

16. In a container fabricating machine, the combination defined in claim 11, wherein:
(a) the working edges of each of said blade means have a convex feathered configuration to allow maximum contact of the tuck-in flap during formation of the closure.

17. In a container fabricating machine, the combination defined in claim 11, wherein:
(a) the leading edge portion of said tucker shoe means is radially aligned to establish flush contact with the tuck-over panels prior to engagement of the tuck-in panel by said blade means.

18. In a container fabricating machine, the combination defined in claim 11, wherein:
(a) the trailing edge portions of said blade means have different configuration to allow for the angular path of travel of the tubular blank.

19. In a container fabricating machine, the combination defined in claim 18, wherein:
(a) the leading edge portion of the outboard one of said blade means and the trailing edge portion of the inboard one of said blade means are further from their respective spindles than the corresponding portions of the opposite blade.

20. In a container fabricating machine, a folding apparatus to operate on tubular blank end closure panels comprising:

(a) a support means;
(b) rotary folding means on said support means;
(c) rotary turret means on said support means for moving the tubular blanks;
(d) drive means operatively connected to said rotary folding means for rotating the same into operative engagement with the closure panels;
(e) an overload clutch device connected between said drive means and said rotary folding means being operable for automatic disengagement in the event of a tubular blank jam-up by said rotary folding means to prevent damage thereto;
(f) means responsive to the disengagement of said clutch device for simultaneous stoppage of the machine;
(g) said overload clutch device having a thrust plate portion connected to said drive means;
(h) a plurality of detents in one surface of said thrust plate;
(i) a pressure plate spring biased toward said thrust plate detent surface;
(j) a ball located intermediate said thrust plate and said pressure plate in each of said detents;
(k) a ball retainer ring intermediate said plates and adapted for retention of said balls; and
(l) said ball retainer ring connected to said rotary folding means and said manually operable means wherein by moving said balls by said manually operable means to their next succeeding detent will automatically reset said folding means in timed relation to said rotating turret.

21. In a container fabricating machine the combination defined in claim 20, wherein:
(a) switch means responsive to movement of said pressure plate for stopping and starting of said machine.

References Cited

UNITED STATES PATENTS

| | | | |
|---|---|---|---|
| 1,593,827 | 7/1926 | Howard | 93—44.1 |
| 1,847,998 | 3/1932 | Bergstein | 93—49 |
| 3,187,646 | 6/1965 | Monroe | 93—44.1 |

WAYNE A. MORSE, JR., *Primary Examiner.*